United States Patent
Janich

[15] 3,672,502
[45] June 27, 1972

[54] APPARATUS FOR PURIFYING DUST LOADED WASTE GASES

[72] Inventor: Hans Jurgen Janich, Beckum, Germany

[73] Assignee: Polysius G.m.b.H., Neubeckum, Germany

[22] Filed: March 27, 1970

[21] Appl. No.: 20,873

Related U.S. Application Data

[63] Continuation of Ser. No. 783,469, Dec. 13, 1968, abandoned.

[52] U.S. Cl................................................209/144, 55/343
[51] Int. Cl.............................................................B04c 5/28
[58] Field of Search....................209/143, 144; 55/343, 345, 55/346, 348

[56] References Cited

UNITED STATES PATENTS

| | | |
|---|---|---|
| 956,817 | 5/1910 | Morscher..................................55/345 |
| 969,971 | 9/1910 | Morscher................................209/144 |
| 1,416,995 | 5/1922 | Stroud......................................55/343 |
| 1,724,041 | 8/1929 | Plaisted............................209/144 UX |
| 2,943,735 | 7/1960 | Payne.....................................209/144 |
| 2,986,278 | 5/1961 | Bjorklund..............................209/144 |
| 3,415,042 | 12/1968 | Wilson......................................55/348 |

FOREIGN PATENTS OR APPLICATIONS

| | | |
|---|---|---|
| 172,838 | 12/1921 | Great Britain............................55/345 |
| 1,155,752 | 12/1957 | France......................................55/343 |

*Primary Examiner*—Frank W. Lutter
*Assistant Examiner*—Ralph J. Hill
*Attorney*—Walter Becker

[57] ABSTRACT

An apparatus for purifying waste gases of furnaces, which comprises a substantially centrally located waste gas feeding pipe leading into a pre-separator and having twist producing means arranged in its lower end while cyclones distributed around said pre-separator have inlet means communicating with said pre-separator and also have first outlet means for releasing fine separated dust into a collecting chamber and furthermore have second outlet means communicating with a purified gas collecting chamber.

5 Claims, 1 Drawing Figure

PATENTED JUN 27 1972 3,672,502
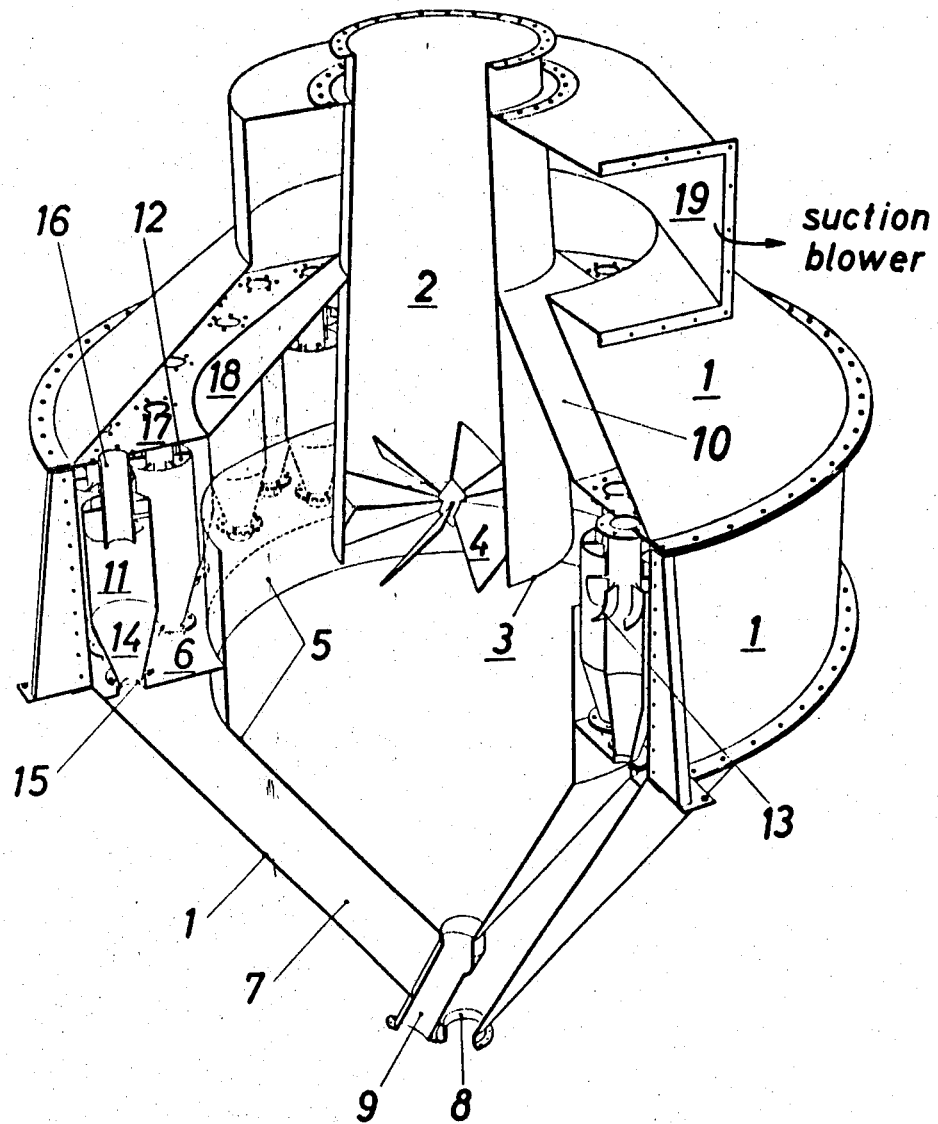

APPARATUS FOR PURIFYING DUST LOADED WASTE GASES

This application is a continuation of Ser. No. 783,469, filed Dec. 13, 1968, now abandoned.

The present invention concerns an apparatus for cleaning dust loaded waste gases of furnaces, especially cupola furnaces, which comprises a pre-separator and a post-separator arranged around said pre-separator and formed by parallelly arranged cyclones while in the pre-separator there is centrally arranged a vertical waste gas feeding pipe which conically widens up to its mouth, whereas above the pre-separator there is provided a collecting chamber which collects pure gas and into which lead the immersion tubes of the cyclones.

The purification of dust loaded waste gases from furnaces is customarily effected in multi-cyclone plates, the best known ones of which comprise a number of individual parallelly arranged cyclones of the same type which are provided with tangential gas inlets. The said cyclones are arranged in rows adjacent to each other. These separators receive the waste gases through a waste gas distributor channel common thereto, and the purified gases are withdrawn through a purified gas collecting passage.

A multi-cyclone of this type, in which the individual cyclones are arranged on a minimum space, have the drawback that the cyclones arranged parallel to each other will, in view of their different spacing from the entry of the waste gases to be freed from dust into the distributor passage, be acted upon by uneven quantities of gas, and furthermore will be loaded with dust of all fractions contained in the flue gases. The separating degree or separating rate obtainable with a plant of this type is, therefore, only low and does not meet the requirements of a modern dust removing device.

In an effort to increase the degree of efficiency of cyclone dust separators, dust separator installations have been suggested according to which a pre-separator designed as a sedimentation shaft has on the outside of the housing of the dust separator plant associated therewith a plurality of cyclones which form fine separators and communicate with the pre-separator through gas feeding passages. The immersion tubes of said last mentioned cyclones lead into a purified gas collecting chamber which is located above the pre-separator. The waste gases are fed centrally from above into the pre-separator and are deviated therein whereupon they pass through the cyclones and pass in purified condition in opposite direction into the purified gas collecting chamber.

While such a design permits a more uniform distribution of the gases to be purified over the cyclones, also in this instance, the fine separators are not particularly relieved from coarse dust. This is due to the fact that the degree of separation of the pre-separator in which a pre-purification of the waste gases is effected by a mere deviation of the waste gases, is rather low. A further disadvantage of such an arrangement consists in the considerable space required thereby. It will be appreciated that the minimum length of the gas feeding and gas withdrawing pipes which connect the cyclones with the pre-separator housing require considerable space for the entire arrangement when the cyclones are distributed around the pre-separator. Furthermore, the heretofore known cyclones have long material discharging conduits in order to convey the separated dust into the lower portion of the pre-separator. This requires an increase in the overall structure of such device.

It is, therefore, an object of the present invention to provide an apparatus for cleaning dust loaded waste gases, which will overcome the above mentioned drawbacks.

It is another object of this invention to provide an apparatus for cleaning dust loaded waste gases, which will greatly improve the separating degree of the pre-separator and therefore the degree of dust removal of fine separators.

These and other objects and advantages of the invention will appear more clearly from the following specification, in connection with the accompanying drawing, which perspectively indicates a device according to the invention for purifying dust loaded waste gases, in which the separating degree of the pre-separator and thereby the degree of dust removal of the fine separator will be considerably improved.

The invention is characterized primarily in that the waste gas feeding pipe within the area of its discharge opening is provided with twist producing guiding elements, and is furthermore characterized in that the pre-separator is surrounded by a substantially coaxial housing extending upwardly beyond the pre-separator and on one hand in the uppermost portion forming the purified gas collecting chamber while on the other hand continuing downwardly in the form of a fine dust collecting funnel. The invention is additionally characterized in that between the housing and the pre-separator there are arranged cyclones receiving the pre-purified waste gases. The discharge ends end in the fine dust collecting chamber which concentrically surrounds the pre-separator. Finally, the invention is characterized in that the lower and upper ends of the cyclones are, by means of radially directed walls, fixed within the housing while the lower walls connect the housing with the preseparator, and the upper walls connect the housing with the waste gas feeding pipe.

With an apparatus of this type, an effective pre-dust-separation will be assured in a reliable manner. It will be appreciated that the dust loaded waste gases expelled from the waste gas feeding pipe in a rotating manner will in the pre-separator carry out a spiral movement and will then, in view of the centrifugal forces, contact the wall of said pre-separator whereby they will lose their kinematic energy and will be separated from the waste gases. Since within the housing an underpressure will be produced by a suction blower which withdraws the purified gases from the purified gas collecting chamber, the waste gases which rotate in the pre-separator change their direction of movement and pass to the cyclones for purposes of a post dust separation. In this way, the separating process initiated by centrifugal force in the pre-separator is aided and completed by a succeeding deviation of the waste gases, which deviation reduces the gas velocity. After the coarse dust fraction has been withdrawn to a considerable extent from the waste gases in the pre-separator, and after the fine dust separators located around and equally spaced from the pre-separator and interconnected in parallel arrangement have been acted upon by substantially uniform voluminae of pre-purified gases, a high separating degree and thereby a favorable purification of the waste gases from dust will be assured while exploiting all of the cyclones to a maximum extent. In addition to this effective coupling of pre-separators and post-separators, the arrangement according to the invention will, as it is frequently desired, separately collect the separated course and fine dust.

Referring now to the drawing, there is shown in detail, a waste gas purifying gas installation with the pre-separator according to the invention and the cyclones arranged on a minimum of space. The arrangement according to the invention comprises a housing 1. In said vertical downwardly conically tapering housing 1, there is centrally located a waste gas feeding pipe 2 which receives the waste gases from a furnace (not shown). The said waste gas feeding pipe 2 widens in a frusto-conical manner so as to form a mouth 3. Within the region of said mouth, the waste gas feeding pipe 2 is provided with twist producing guiding elements 4 and within said housing 1 extends into a pre-separator 5 coaxially surrounded by said housing. The pre-separator 5 which has a considerably greater diameter than the waste gas feeding pipe 2 is rigidly connected to the housing 1 by means of an annular wall 6. Housing 1 extends downwardly in the form of a fine dust collecting funnel 7 which is provided with a fine material outlet 8 and coaxially surrounds the pre-separator 5, the lowermost portion of which is provided with a coarse dust outlet 9. The upper-most part of housing 1 is formed by an upwardly tapering purified gas collecting chamber 10. Within the housing 1, between the fine dust collecting funnel 7 and the purified gas collecting chamber 10 there are provided cyclones 11 which are substantially uniformly distributed along a circle about the pre-separator 5. These cyclones 11 have axial gas inlets 12 which, for purposes of producing a gas turbulence, are provided with guide vanes 13. At the lower end, the cyclones 11 are provided with discharge outlets 14 and are mounted on the radially extending wall 6 which has perforations 15 into which the outlets 14 are fitted. The immersing pipes 16 which lead into the purified gas collecting chamber 10 and pertain to the cyclones 11 are fixed in an annular wall 17 which forms the bottom of the purified gas collecting chamber 10. A conical wall 18 is arranged adjacent the inner marginal area of said wall 17 and is connected to the waste gas feeding pipe 2 to thereby stiffen or brace the structure.

The operation of the device shown in the drawing is as follows: the dust loaded waste gases blown into the waste gas feeding pipe 2 are, by means of the guiding elements 4, subjected to rotation and are thus blown into the pre-separator 5. The coarse dust then moves along a spiral path and due to the centrifugal force acting thereupon contacts the wall of the pre-separator 5 whereupon it drops to the lowest section of said pre-separator 5. In view of the under-pressure prevailing in the housing 1 (which underpressure is produced by the suction blower connected to the member 19 which, in its turn, communicates with the purified gas collecting chamber 10) the waste gases change their direction of movement and in a pre-purified condition pass through the upper end of the pre-separator 5 to the cyclones 11 where they are substantially evenly distributed while passing between the guiding blades 13 and axially pass through the cyclones. The cyclones separate the fine dust from the pre-purified waste gases, and the thus separated fine dust is collected in the fine dust collecting funnel 7. The purified gases thus pass through the pipes 16 of cyclones 11 into the purified gas collecting chamber 10 from where the purified gases are at the purified gas exit 19 of the purified gas collecting chamber 10 withdrawn by a suction blower (not shown).

As will be evident from the above, the separator plant according to the invention has a compact construction and therefore requires relatively little space. In this connection, it should be noted that the cyclones are employed with axial gas flow inlet without inlet spiral while the cyclones are arranged around the turbulence pipe at a minimum distance therefrom. In this way, the overall diameter of the installation is considerably reduced over heretofore known designs of multicyclones with post-separator arranged outside the pre-separator. Furthermore, gas feeding passages which normally require considerable length and are located between the pre-separator and cyclones will not be needed, and consequently the purifying gas outlet pipe sections leading into the purifying gas collecting chamber are also superfluous. In view of the fact that with the arrangement according to the invention, the radial walls which connect the housing with the pre-separator and the waste gas discharging pipe assure the connection of the elements of the installation, and at the same time secure the cyclones in their respective position, special supporting elements for the post-separators are no longer needed.

It is, of course, to be understood that the present invention is, by no means, limited to the particular construction shown in the drawing, but also comprises modifications within the scope of the appended claims.

I claim:

1. A coaxially arranged two-stage separator apparatus for purifying waste gases of furnaces, which includes: pre-separator means with the lower portion thereof forming a funnel-shaped dust collecting chamber, feeding pipe means extending into said pre-separator means for feeding waste gas into said pre-separator means, twist producing guiding means arranged in said feeding pipe means at that end portion thereof which extends into said pre-separator means to impart a circulatory movement upon the waste gases leaving said feeding pipe means, housing means substantially coaxially arranged with and in radially outwardly spaced relationship to said pre-separator means so as to surround said pre-separator means and define an annular chamber therewith, the lower portion of said housing means forming a fine dust collecting chamber and the upper portion of said housing means forming a purified gas collecting chamber, said purified gas collecting chamber comprising means adapted to be connected to a suction blower for withdrawing purified gas from said purified gas collecting chamber, a plurality of cyclones each having a cylindrical portion in substantially abutting relationship to an adjoining cylindrical portion above a conical lower portion thereof and arranged closely in parallel with regard to each other and distributed in said annular chamber around said pre-separator means and having axial inlet means for communication with said pre-separator means and also having first outlet means leading into said fine dust collecting chamber, said cyclones furthermore having second outlet means communicating with said purified gas collecting chamber means, first radially extending wall means between said pre-separator means and said housing means and supporting particularly the conical lower portions respectively of said cyclones, said radially extending wall means having passages therethrough communicating with said first outlet means of said cyclones and said fine dust collecting chamber, said purified gas collecting chamber means including second wall means extending radially outwardly of said feeding pipe means in vertically spaced relationship to said first radially extending wall means and interconnecting said feeding pipe means and said housing means, and immersing pipe means forming the second outlet means of said cyclones and connected to said second radially extending wall means and opening into said purified gas collecting chamber means.

2. An apparatus according to claim 1, in which said feeding pipe means tapers from its inner end surrounding said twist producing means to its outer end.

3. An apparatus according to claim 1, in which the lower portion of said fine dust collecting chamber ends in a fine dust discharge passage.

4. An apparatus according to claim 1, in which the lower portion of said coarse dust collecting chamber is provided with outlet means.

5. An apparatus according to claim 1, in which the conical end of each cyclone has a radial flange joined to the radial extending wall means supporting said cyclones, said flange having a diameter not larger than the upper portion of said cyclone, so that said cyclones may be closely spaced while supported by said flanges.

* * * * *